(12) United States Patent
Kinoshita et al.

(10) Patent No.: US 9,608,280 B2
(45) Date of Patent: Mar. 28, 2017

(54) BATTERY TEMPERATURE CONTROL DEVICE

(75) Inventors: Takuya Kinoshita, Yokohama (JP); Atsushi Takano, Sagamihara (JP); Takashi Iimori, Tokyo (JP); Kazuhiko Okino, Yokohama (JP); Hisashi Niioka, Yokohama (JP); Naoki Yamamoto, Kawasaki (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 280 days.

(21) Appl. No.: 13/979,767

(22) PCT Filed: Feb. 29, 2012

(86) PCT No.: PCT/JP2012/055055
§ 371 (c)(1),
(2), (4) Date: Jul. 15, 2013

(87) PCT Pub. No.: WO2012/124477
PCT Pub. Date: Sep. 20, 2012

(65) Prior Publication Data
US 2013/0288089 A1 Oct. 31, 2013

(30) Foreign Application Priority Data
Mar. 11, 2011 (JP) .................. 2011-054081

(51) Int. Cl.
*H01M 6/50* (2006.01)
*H01M 10/48* (2006.01)
(Continued)

(52) U.S. Cl.
CPC ............. *H01M 6/5038* (2013.01); *B60L 1/02* (2013.01); *B60L 11/1803* (2013.01);
(Continued)

(58) Field of Classification Search
CPC ............. H01M 10/486; H01M 6/5038; H01M 10/625; H01M 10/615; H01M 10/633;
(Continued)

(56) References Cited

U.S. PATENT DOCUMENTS 5,909,378 A * 6/1999 De Milleville ........ F24F 11/006
236/46 R
7,413,827 B2 8/2008 Inui
(Continued)

FOREIGN PATENT DOCUMENTS

CN 1666371 A 9/2005
CN 101826740 A 9/2010
(Continued)

OTHER PUBLICATIONS

Supplementary European Search Report, dated Jul. 11, 2014, 6 pgs.
(Continued)

*Primary Examiner* — Gary Harris
(74) *Attorney, Agent, or Firm* — Foley & Lardner LLP

(57) ABSTRACT

Provided is a battery temperature control device configured to automatically heat a battery with a battery-driven heater so that the battery does not freeze at a minimum electric power consumption when the battery is out of use. The battery temperature control device predicts, based on a combination of a battery temperature and an outside air temperature, a predictive time that the battery temperature is likely to be less than a first set temperature, while the battery temperature is higher than or equal to the first set temperature at which there is no risk of freezing, and sets the predictive time as the next controller startup time, and determines whether or not the battery temperature has fallen to below the first set temperature with a control program
(Continued)

wakeup when the predictive time has expired, and battery-drives the heater when the battery temperature fall has occurred, to heat the battery.

12 Claims, 5 Drawing Sheets

(51) Int. Cl.

| | | |
|---|---|---|
| B60L 11/18 | (2006.01) | |
| B60L 1/02 | (2006.01) | |
| H01M 10/625 | (2014.01) | |
| H01M 10/615 | (2014.01) | |
| H01M 10/633 | (2014.01) | |

(52) U.S. Cl.
CPC ....... *B60L 11/1816* (2013.01); *B60L 11/1861* (2013.01); *B60L 11/1875* (2013.01); *H01M 10/486* (2013.01); *H01M 10/615* (2015.04); *H01M 10/625* (2015.04); *H01M 10/633* (2015.04); *B60L 2210/30* (2013.01); *B60L 2240/545* (2013.01); *B60L 2240/547* (2013.01); *B60L 2240/549* (2013.01); *B60L 2240/662* (2013.01); *B60L 2240/80* (2013.01); *B60L 2260/56* (2013.01); *H01M 2220/20* (2013.01); *Y02T 10/7005* (2013.01); *Y02T 10/705* (2013.01); *Y02T 10/7044* (2013.01); *Y02T 10/7072* (2013.01); *Y02T 10/7241* (2013.01); *Y02T 10/7291* (2013.01); *Y02T 10/84* (2013.01); *Y02T 90/127* (2013.01); *Y02T 90/14* (2013.01); *Y02T 90/16* (2013.01)

(58) Field of Classification Search
CPC .......... H01M 10/5006; H01M 2220/20; B60L 11/1875; B60L 1/02; B60L 11/1803; B60L 11/1816; B60L 11/1861; B60L 2260/56; B60L 2210/30; Y02T 90/127; Y02T 10/84
USPC .......................................................... 429/62
See application file for complete search history.

(56) References Cited

U.S. PATENT DOCUMENTS

| | | | |
|---|---|---|---|
| 7,645,533 | B2 | 1/2010 | Fukuda |
| 8,078,417 | B2 | 12/2011 | Ishishita |
| 2004/0219409 | A1* | 11/2004 | Isogai ............... H01M 8/04007 429/435 |
| 2005/0264257 | A1 | 12/2005 | Inui |
| 2009/0099800 | A1 | 4/2009 | Ishishita |
| 2013/0183554 | A1* | 7/2013 | Takanezawa et al. .......... 429/62 |

FOREIGN PATENT DOCUMENTS

| | | |
|---|---|---|
| DE | 101 04 64 056 A1 | 8/2002 |
| JP | 2003-203679 A | 7/2003 |
| JP | 2005-339980 A | 12/2005 |
| JP | 2007-311309 A | 11/2007 |
| JP | 2009-146754 A | 7/2009 |
| JP | 2010-088204 A | 4/2010 |
| KR | 1999-0024407 U | 7/1999 |

OTHER PUBLICATIONS

Korean Office Action dated Jan. 21, 2015, 5 pgs.
Chinese Office Action dated Feb. 11, 2015, 7 Pages.

* cited by examiner

FIG.4

NEXT CONTROLLER STARTUP TIME Δt (h)
WITH NO CONNECTION TO BATTERY CHARGER

| BATTERY TEMP. Tbat (°C) \ OUTSIDE AIR TEMP. Tatm (°C) | 40 | 25 | 10 | 0 | -10 | -16 | -17 | -25 | -40 |
|---|---|---|---|---|---|---|---|---|---|
| 40 | 8 | 8 | 24 | 14 | 11 | 9 | 8.5 | 7 | 5.5 |
| 25 | 8 | 8 | 24 | 14 | 10 | 8 | 7.5 | 6 | 4.5 |
| 10 | 8 | 8 | 24 | 14 | 8 | 6.5 | 6 | 5 | 3.5 |
| 0 | 8 | 8 | 24 | 14 | 7 | 5.5 | 5 | 4 | 2.5 |
| -10 | 8 | 8 | 24 | 14 | 5 | 3.5 | 3 | 2 | 1 |
| -16 | 8 | 8 | 24 | 13 | 3 | 1 | 0.5 | 0.5 | 0.5 |
| 1ST SET TEMP. Tbat1 -17 | | | | | | | | | |
| -24 | MAIN RELAY SWITCH TURNED ON, HEATER SWITCH TURNED ON, AND THUS HEATER ACTIVATED | | | | | | | | |
| 2ND SET TEMP. Tbat2 -25 | 0.5 | 0.5 | 0.5 | 0.5 | 0.5 | 1 | 1 | 1 | 6 |
| -30 | 1 | 1.5 | 1.5 | 2 | 3 | 5 | 6 | 8 | 12 |

BATTERY TEMPERATURE CONTROL DEVICE

TECHNICAL FIELD

The present invention relates to a battery temperature control device configured to prevent a temperature fall in a battery used in cold districts, in particular when the battery is out of use.

BACKGROUND ART

In the case of a battery for use in cold districts, such as a battery mounted on an electric vehicle, there is a risk that a battery electrolyte freezes when the battery is out of use.

A temperature fall in the battery does not lead to a fall in a battery's state of charge SOC. However, owing to the increased internal resistance, the inputable/outputable electric power tends to fall. When a battery electrolyte has frozen, the inputable/outputable electric power becomes "0" at last, and hence an electric vehicle that a battery is an energy source for vehicle running, falls into a power-running disabling state.

Therefore, it is necessary to provide a battery temperature control device configured to temperature-control by heating the battery by using a heater before a battery temperature fall develops until such time that the inputable/outputable electric power of the battery reaches the previously-discussed inconvenient state (the power-running disabling state).

One such battery temperature control device, which is configured to temperature-control by heating the battery by using a heater, has been proposed in Patent document 1.

The battery temperature control device, proposed in the Patent document 1, is configured to control or regulate a temperature of an on-vehicle battery, and also configured to heat the battery by the heater, when an outside air temperature becomes fallen to below a preset minimum temperature at a point of time when an ignition switch becomes turned OFF.

CITATION LIST

Patent Literature

Patent document 1: Japanese patent provisional publication No. 2003-203679 (A)

SUMMARY OF INVENTION

However, the previously-discussed prior-art battery temperature control device is configured to heat the battery by the heater only depending on the outside air temperature at the point of time when the ignition switch becomes turned OFF. On the other hand, even when, owing to a high outside air temperature at the time when the ignition switch has been turned OFF, the heater has not yet been energized or activated (turned ON) during initial stages of the ignition-switch turn-OFF period, and thereafter the outside air temperature has fallen, the heater is undesirably kept continuously at its de-energized or deactivated (turned OFF) state.

In such a case, even if the outside air temperature falls to below a freezing point of a battery electrolyte, the heater will not be energized or activated. This leads to the problem that the inputable/outputable electric power becomes "0" at last owing to freezing of the battery electrolyte, and hence the electric vehicle, configured to run by a battery's power, falls into a power-running disabling state.

Accordingly, it is an object of the invention to provide a battery temperature control device configured to avoid the previously-discussed problem by predicting, based on a combination of a battery temperature and an outside air temperature, a predictive time before the battery temperature reaches a low temperature that produces the previously-discussed problem, and by performing heating-control for a battery in accordance with time management based on the predictive time.

In order to accomplish the aforementioned objects, a battery temperature control device of the present invention is constructed as follows:

Hereinafter explained is a prerequisite for battery-temperature control executed by the battery temperature control device of the invention. That is, the battery temperature control device of the invention is basically constructed to initiate the temperature control by heating the battery by means of a heater, when the battery becomes less than a predetermined temperature.

In addition the basic configuration of the battery temperature control device, the invention is characterized by a battery-temperature fall time prediction means and a heating necessity determination means.

The former battery-temperature fall time prediction means is provided for predicting, based on a combination of a battery temperature and an outside air temperature, a predictive time that the battery is likely to be less than the previously-discussed predetermined temperature. On the other hand, the latter heating necessity determination means is provided for determining a necessity of heating with the heater by determining whether the battery is less than the predetermined temperature when the predictive time has expired.

According to the battery temperature control device of the invention, a prediction time before the battery is likely to be less than the previously-discussed predetermined temperature is predicted based on a combination of the battery temperature and the outside air temperature, and then a determination on whether the battery is less than the predetermined temperature is carried out when the predictive time has expired, so as to determine a necessity of heating with the heater.

Hence, even when, owing to a high outside air temperature, the heater has not yet been energized or activated (turned ON) during the initial stages, a determination on whether the battery is less than the predetermined temperature (that is, a determination on a necessity of heating with the heater) can be carried out at another time when the aforementioned predictive time has expired.

Therefore, even when, owing to a high outside air temperature, the heater has not yet been energized or activated (turned ON) during the initial stages and thereafter owing to a fall in the outside air temperature the battery becomes less than the predetermined temperature, it is possible to certainly temperature-control the battery by heating via the heater.

Hence, it is possible to avoid the battery from remaining less than the predetermined temperature, and thus it is possible to prevent the worst situation, for example, a situation such that a battery electrolyte freezes.

Additionally, only when it has been determined that the battery becomes less than the predetermined temperature at another time when the predictive time has expired, the battery can be heated by the heater, thereby ensuring the aforementioned effects. In this manner, the battery temperature control device starts up only when battery temperature control is really required, and hence it is possible to achieve the aforementioned effects with a minimum electric power consumption.

BRIEF DESCRIPTION OF DRAWINGS

FIG. 4 is a map of the next controller startup time obtained by the program of FIG. 3 when a temperature of a battery being out of use, is within a temperature range that there is no risk of freezing.

DESCRIPTION OF EMBODIMENTS

The embodiment made according to the invention is hereinafter described in detail with reference to the drawings.

<Configuration of Embodiment>

Figure 1:
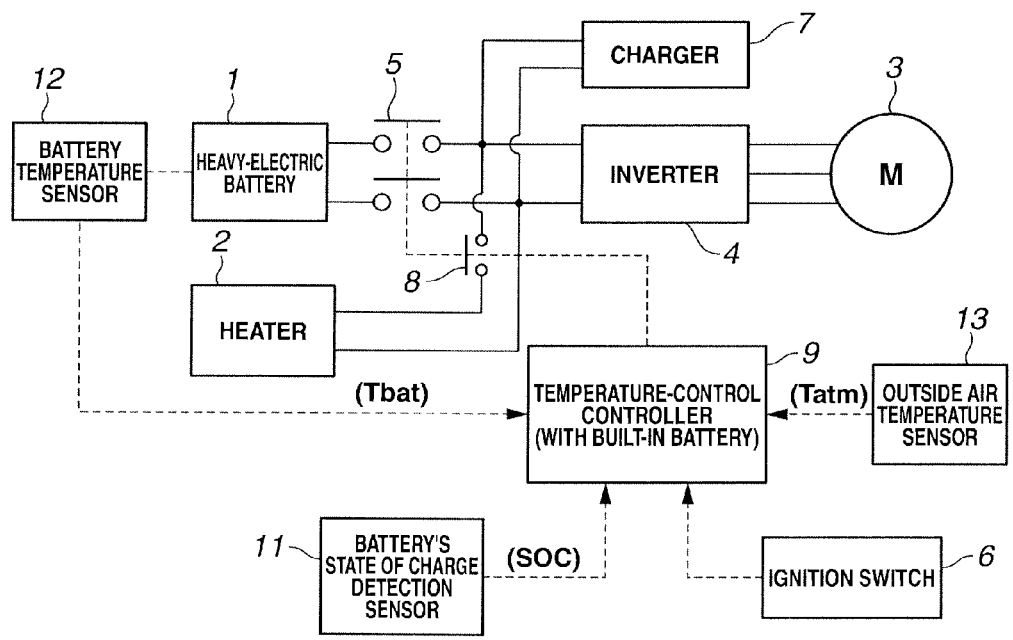
FIG. 1 is a schematic control system diagram illustrating one embodiment of a battery temperature control device made according to the invention.
Figure 2:
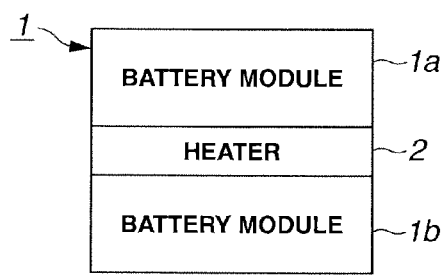
FIG. 2 is an explanatory view illustrating the gist of installation of a heater shown in FIG. 1.

FIG. 1 is the control system diagram of the battery temperature control device of the embodiment made according to the invention. In the shown embodiment, the battery temperature control device is configured to temperature-control a heavy-electric battery 1 for an electrically-driven vehicle such as an electric vehicle, a hybrid vehicle, and the like. As shown in FIG. 2, the heavy-electric battery 1 is formed as a large-capacity battery suited to drive an electric motor and produced by unifying a plurality of battery modules 1a, 1b (two modules in FIG. 2), each of which is constructed as a unit by laminating a plurality of battery cells, into one set.

A component, denoted by reference sign "2" in FIG. 1 is a heater for temperature-controlling the battery 1. As shown in FIG. 2, heater 2 is laid out along a direction of laminating of the battery cells and located in close proximity to the battery modules 1a, 1b.

A component, denoted by "3" in FIG. 1 is an electric motor used for power-running of the electrically-driven vehicle. Electric motor 3 is electrically connected to the battery 1 via an inverter 4.

A main relay switch 5 is placed in the electric circuit between the inverter 4 and the battery 1. The main relay switch 5 is opened or closed in synchronism with operation of an ignition switch 6 of the electrically-driven vehicle via a drive controller (not shown). When the ignition switch 6 becomes turned ON, the main relay switch becomes closed. Conversely when the ignition switch 6 becomes turned OFF, the main relay switch becomes open.

During a time period that the main relay switch 5 is kept closed in synchronism with the turning-ON of ignition switch 6, a direct-current (dc) power from battery 1 is dc-to-ac-converted via the inverter 4, and then directed and outputted to the electric motor 3 under control via the inverter 4, in a manner so as to enable the electrically-driven vehicle to run by driving the motor 3.

Conversely during a time period that the main relay switch 5 is kept open in synchronism with the turning-OFF of ignition switch 6, a dc power from battery 1 cannot be directed to the electric motor 3, in a manner so as to enable the electrically-driven vehicle to be kept in a stopped state with the motor 3 stopped rotating.

A battery charger 7 is connected between the direct-current side of inverter 4 and the main relay switch 5, for enabling the battery 1 to be charged by an external power source with the main relay switch 5 closed by a charging controller (not shown) when the charger 7 has been connected to the external power source.

<Battery Temperature Control>Details of the temperature control device of battery 1, utilized as discussed above, are hereunder explained.

As shown in FIG. 1, heater 2 (described previously in reference to FIG. 2), which is laid out along the direction of laminating of the battery cells and located in close proximity to the battery modules 1a, 1b, is electrically connected between the direct-current side of inverter 4 and the main relay switch 5. A heater switch 8 is placed in the electric circuit between the above-mentioned connected portion (the junction) and the heater 2.

The opening or closing of heater switch 8 can be controlled by a temperature-control controller 9 (i.e., a built-in battery equipped, self-startable controller) for temperature control of battery 1.

The temperature-control controller 9 is further configured to open or close the main relay switch 5 when the main relay switch 5 is opened in synchronism with the turning-OFF of ignition switch 6.

Actually, when the heater switch 8 is closed, the temperature-control controller 9 operates to close the main relay switch 5 in synchronism with the closing of the heater switch, so as to energize or activate (turn ON) the heater 2. Conversely when the heater switch 8 is opened, the temperature-control controller 9 operates to open the main relay switch 5 in synchronism with the opening of the heater switch, so as to de-energize or deactivate (turn OFF) the heater 2.

For the purpose of executing ON/OFF control of heater 2 via the aforementioned synchronous opening/closing operation of the main relay switch 5 with respect to operation of the heater switch 8, the temperature-control controller 9 receives an ON or OFF signal from the ignition switch 6, a signal from a battery's state-of-charge sensor 11 for detecting a state of charge (SOC) of battery 1, a signal from a battery temperature sensor 12 for detecting a temperature Tbat of battery 1, and a signal from an outside air temperature sensor 13 for detecting an outside air temperature Tatm.

Figure 3:
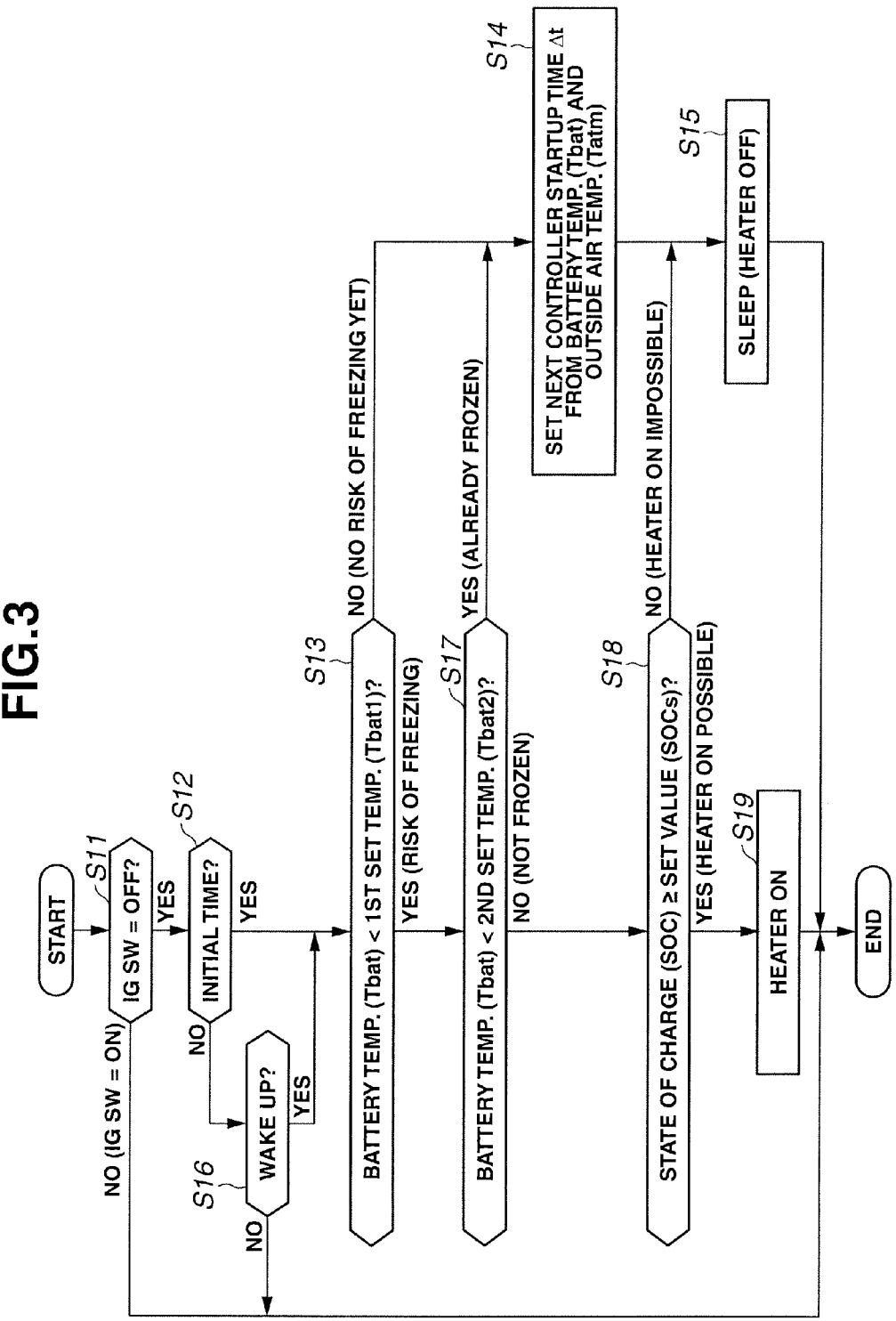
FIG. 3 is a flowchart illustrating a battery temperature control program executed within a temperature-control controller shown in FIG. 1.

Temperature-control controller 9 is also configured to execute, based on these input information data signals, the control program shown in FIG. 3, so as to carry out temperature control of battery 1, in accordance with the following procedure.

At step S11, a check is made to determine whether the ignition switch 6 is in a turn-OFF state.

When the ignition switch 6 is out of the turn-OFF state (that is, in the turn-ON state), the main relay switch 5 is closed in synchronism with the turning-ON of ignition switch 6, so as to enable the vehicle to run by driving the motor 3. In this case, this control just terminates so as to skip the loop of FIG. 3.

When step S11 determines that the ignition switch 6 is in the turn-OFF state, the routine proceeds to step S12 at which another check is made to determine whether the first switching operation of ignition switch 6 to its turn-OFF state has occurred, that is, whether it is a point of time immediately after switching of ignition switch 6 from ON to OFF.

Immediately after the ignition switch 6 has been turned OFF, the routine proceeds to step S13, corresponding to the heating necessity determination means of the invention, at which another check is made to determine whether the battery temperature Tbat is less than a first set temperature Tbat1.

The first set temperature Tbat1 is a set value needed for determining whether there is a risk that an electrolyte of battery 1 freezes. For instance, the first set temperature is determined or set as follows:

When battery temperature Tbat becomes a low temperature than, for example, temperatures ranging from −25° C. to −30° C., the battery electrolyte freezes and thus the inputable/outputable electric power of battery 1 becomes "0". To certainly avoid undesirable falling into the worst situation, it is preferable to heat the battery 1 by the heater 2 from a point of time at which the battery temperature Tbat becomes a certain low temperature, such as approximately −20° C., preferably −17° C., allowing for a margin.

Therefore, in the shown embodiment, a given temperature, for example, approximately −17° C. is set as the first set temperature Tbat1.

When step S13 determines that the battery temperature Tbat does not become less than the first set temperature Tbat1, that is, when Tbat<Tbat1 is unsatisfied, in other words, when the battery temperature Tbat is still high to such a degree that there is no risk of freezing of the battery electrolyte, the routine proceeds to step S14.

At step S14, a predictive time before the battery temperature Tbat is likely to be less than the first set temperature Tbat1 is predicted based on a combination of the battery temperature Tbat and the outside air temperature Tatm, from the preprogrammed map exemplified in FIG. 4. The predictive time is set at a "sleep" time (the next controller startup time) Δt that the control program of FIG. 3 is initiated again by the next startup of the temperature-control controller 9 upon expiration of the "sleep" time.

Therefore, steps S13 and S14 correspond to the battery-temperature fall time prediction means of the invention.

At the next step S15, heater switch 8 and main relay switch 5 are opened by the temperature-control controller 9 for bringing the system into a sleep state with the heater 2 turned OFF.

Figure 5:
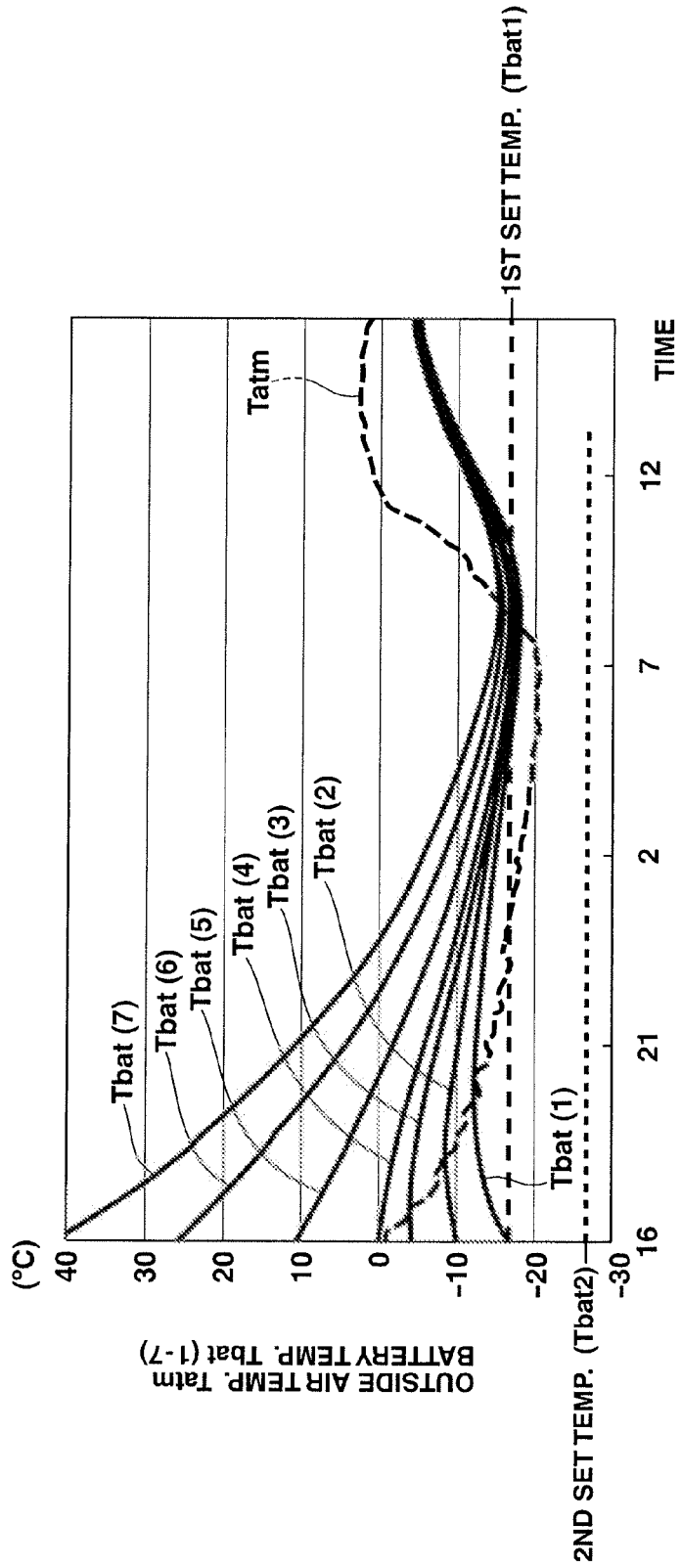
FIG. 5 is a time chart exemplifying a time-dependent change in each of various battery temperatures as well as an outside air temperature in a specific district.
Figure 6:
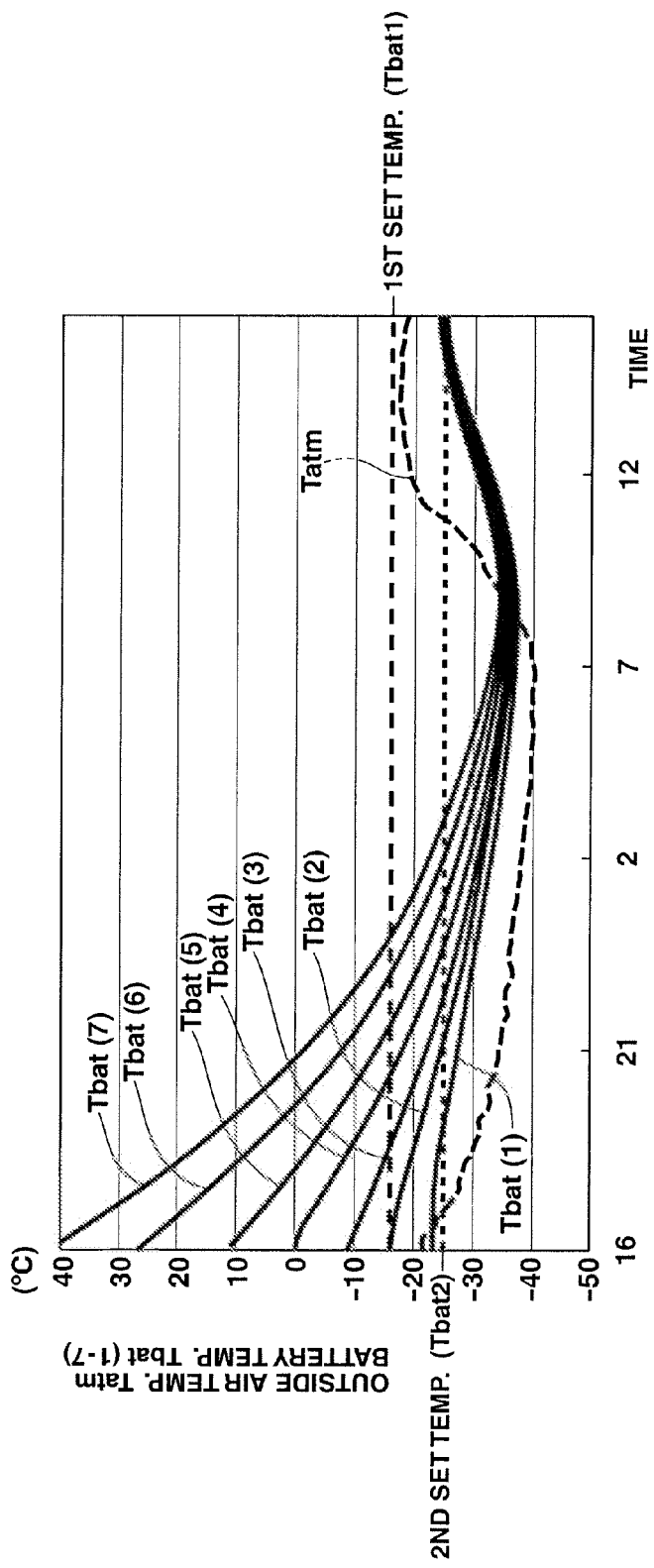
FIG. 6 is a time chart exemplifying another time-dependent change in each of various battery temperatures as well as an outside air temperature in the same specific district.

Details of the next controller startup time Δt (the time before the battery temperature Tbat falls to the first set temperature Tbat1), set through step S14, are described in reference to FIGS. 5-6.

Referring to FIGS. 5-6, there are two measured data, obtained by plotting respective changes in battery temperatures Tbat(1) to Tbat(7) under a condition where a fall in outside air temperature Tatm is remarkable at various initial battery temperatures differing from each other.

When battery temperatures Tbat(1)-Tbat(7) fall to below a freezing point of a battery electrolyte, the battery electrolyte freezes and thus the battery does not function without any battery action.

The next controller startup time Δt (the time before the battery temperature Tbat falls to the first set temperature Tbat1) is determined on the assumption that the key-OFF timing of ignition switch 6 is approximately 16 o'clock where a fall in outside air temperature Tatm would start.

A battery temperature, corresponding to an electric power needed to activate the heater 2, obtainable from the battery 1 before the battery 1 freezes, is set as the first set temperature Tbat1 (e.g., −17° C.). From the time chart of FIG. 6, for respective initial battery temperatures at the outside air temperature of −20° C., it is possible to read when (how many hours later) the temperature-control controller 9 should be started up.

When the ignition switch 6 is turned OFF at 16 o'clock where a fall in outside air temperature Tatm would start, the degree of a temperature fall in outside air temperature Tatm after the turning-OFF of the ignition switch is large and thus battery 1 gets cold earliest.

As appreciated from the time charts of FIGS. 5-6, on the supposition that the battery 1 gets cold earliest, the next controller startup time is read. The results of readings are shown in the map of FIG. 4.

Therefore, at step S14, from the map exemplified in FIG. 4, it is possible to set, based on a combination of the battery temperature Tbat and the outside air temperature Tatm, the time before the battery temperature Tbat falls to the first set temperature Tbat1, that is, a sleep time (the next controller startup time) Δt that the control program of FIG. 3 is initiated again by the next startup of the temperature-control controller 9 upon expiration of the sleep time.

With execution of the previously-discussed control via the loop including a series of steps S11 to S15, heater switch 8 and main relay switch 5 are opened by the temperature-control controller 9 and thus the control system is brought into a sleep state with the heater 2 turned OFF. Thereafter, the time, elapsed from the point of time of a state change to the sleep state, is measured by means of the built-in timer of temperature-control controller 9, so as to maintain the sleep state until such time that the next controller startup time Δt, set at step S14, has expired.

Immediately when the next controller startup time Δt has expired from the point of time of a state change to the sleep state, the temperature-control controller 9 executes again the control program of FIG. 3 so as to initiate a "wakeup" of the system.

During such a "wakeup", step S12 never determines the first turning-OFF, and thus the control routine proceeds to step S16. Thereafter, on the basis of the result of determination that the above-mentioned "wakeup" has been initiated, the routine proceeds to step S13.

Just after the system has been maintained in the sleep state for the time Δt, when step S13 determines that the battery temperature Tbat does not yet become less than the first set temperature Tbat1, the routine proceeds again to steps S14 and S15. Thus, the sleep state is maintained and lengthened by the next controller startup time Δt, newly set at step S14.

During the newly-set time interval, as soon as the battery temperature Tbat becomes less than the first set temperature Tbat1, step S13 determines such a battery temperature fall and thus the routine proceeds to step S17. At step S17, a check is made to determine whether the battery temperature Tbat is less than a second set temperature Tbat2.

The second set temperature Tbat2 is a set value needed for determining whether the inputable/outputable electric power becomes "0" owing to the electrolyte of battery 1, already frozen or just before frozen, in other words, it is impossible to heat the battery by means of the heater 2. For instance, the second set temperature is determined or set as follows:

When battery temperature Tbat becomes a low temperature than, for example, temperatures ranging from −25° C. to −30° C., the battery electrolyte freezes and thus the battery 1 cannot activate the heater 2, thus disabling heating (temperature-controlling) of the battery 1 by means of the heater. Therefore, in the shown embodiment, a given temperature, for example, approximately −25° C. is set at the second set temperature Tbat2.

When step S17 determines that Tbat<Tbat2 is satisfied (that is, battery 1 cannot activate the heater 2), the routine proceeds to step S14. At this step S14, a predictive time that the thawing of the battery electrolyte takes is predicted based on a combination of the battery temperature Tbat and the outside air temperature Tatm, from another map (concerning the time before the battery electrolyte thaws out), differing from the previously-discussed map of FIG. 4 but derived from plotted data concerning a battery temperature rise in each of battery temperatures Tbat(1) to Tbat(7) occurring due to a rise in outside air temperature Tatm, beginning to rise after 7 o'clock in FIGS. 5-6, in accordance with the procedure similar to the derived map of FIG. 4. The predictive time is set at a sleep time (the next controller startup time) Δt that the control program of FIG. 3 is initiated again by the next startup of the temperature-control controller 9 upon expiration of the sleep time.

Therefore, steps S17 and S14 correspond to a battery electrolyte thawing time prediction means of the invention.

At the next step S15, heater switch 8 and main relay switch 5 are opened by the temperature-control controller 9 for bringing the system into a sleep state with the heater 2 turned OFF.

With execution of the previously-discussed control via the control loop including a series of steps, that is, the flow from step S11 through steps S12, S16, S13, S17, and S14 to step S15, heater switch 8 and main relay switch 5 are opened by the temperature-control controller 9 and thus the control system is brought into a sleep state with the heater 2 turned OFF.

Thereafter, the time, elapsed from the point of time of a state change to the sleep state, is measured by means of the built-in timer of temperature-control controller 9, so as to maintain the sleep state until such time that the next controller startup time Δt, set at step S14, has expired.

Immediately when the next controller startup time Δt has expired from the point of time of a state change to the sleep state, the temperature-control controller 9 executes again the control program of FIG. 3 so as to initiate a "wakeup" of the system.

Just after the system has been maintained in the sleep state for the time Δt, when step S17 determines that the battery temperature Tbat still becomes less than the second set temperature Tbat2, the routine proceeds again to steps S14 and S15. Thus, the sleep state is maintained and lengthened by the next controller startup time Δt, newly set at step S14.

During the newly-set time interval, as soon as the battery temperature Tbat becomes higher than or equal to the second set temperature Tbat2 (that is, battery 1 can activate the heater 2 owing to the battery electrolyte thawed out), step S17 determines such a battery temperature rise and thus the routine proceeds to step S18. At step S18, a check is made to determine whether the state of charge (SOC) is greater than or equal to a set value SOCs that can activate the heater 2.

When step S18 determines that SOC<SOCs is satisfied, that is, in the case of the negative answer (NO) that battery 1 is out of a state of charge capable of activating the heater 2, with execution of step S15, heater switch 8 and main relay switch 5 are opened by the temperature-control controller 9 for bringing the system into a sleep state with the heater 2 turned OFF.

In contrast, when step S18 determines that SOC≥SOCs is satisfied, that is, in the case of the affirmative answer (YES) that battery 1 is in a state of charge capable of activating the heater 2, the routine proceeds to step S19. At this step S19, heater switch 8 and main relay switch 5 are closed by the temperature-control controller 9 for activating the heater 2 by an electric power inputted from the battery 1 and for heating the battery 1 itself.

When the battery temperature Tbat exceeds the first set temperature Tbat1 owing to a temperature rise in battery 1, heated by the heater 2, step S13 determines such a battery temperature rise and thus the routine proceeds to steps S14 and S15.

As a result of the above, temperature-control controller 9 functions to maintain a sleep state during the next controller startup time Δt, set at step S14, and also functions to execute again (wake up) the control program of FIG. 3 immediately when the time Δt has expired, so as to repeatedly execute the previously-discussed battery temperature control.

<Effects of Embodiment>

According to the battery temperature control of the invention, when battery 1 is out of use with the ignition switch 6 turned OFF, temperature control for battery 1 is performed as follows:

A predictive time that the battery temperature Tbat is likely to be less than the first set temperature Tbat1 is predicted based on a combination of the battery temperature Tbat and the outside air temperature Tatm, while the battery temperature Tbat is higher than or equal to the first set temperature Tbat1 (see step S13), that is, while there is no risk of freezing of the battery electrolyte. The predictive time is set as the next controller startup time Δt (see step S14).

When the next controller startup time Δt has expired, with a "wakeup" of the control program shown in FIG. 3, at step S13 a check is made to determine whether the battery temperature Tbat has fallen to a temperature value less than the first set temperature Tbat1. When such a battery temperature fall condition of Tbat<Tbat1 has been satisfied, heater 2 is battery-driven for heating the battery 1 (see step S19).

Therefore, even when the heater 2 has not yet been activated at the beginning of temperature control of battery 1, at step S13 a determination on whether the battery temperature Tbat has fallen to a temperature value less than the first set temperature Tbat1 (that is, a determination on a necessity of heating with the heater 2) is carried out, at another time with a "wakeup" only upon expiration of the next controller startup time Δt.

Therefore, even when, owing to the condition of Tbat≥Tbat1 (see step S13), the heater 2 has not yet been activated during the initial stages and thereafter owing to a temperature fall the condition of Tbat<Tbat1 (see step S13) becomes satisfied, it is possible to certainly temperature-control the battery 1 by heating via the heater (see step S19).

Hence, it is possible to avoid the battery 1 from remaining less than the first set temperature Tbat1, and thus it is possible to prevent the worst situation, for example, a situation such that the battery electrolyte freezes.

Additionally, only when step S13 determines that Tbat<Tbat1 becomes satisfied, with a "wakeup" of the control program shown in FIG. 3, at another time when the previously-discussed next controller startup time Δt has expired, the battery 1 can be heated by the heater 2, so as to provide the effects as discussed previously. During the time period in which battery 1 is out of use with the ignition switch 6 turned OFF, the heater 2 cannot be activated, unless battery temperature control is really required (that is, unless the condition of Tbat<Tbat1 is satisfied). Hence, it is possible to achieve the aforementioned effects with a minimum electric power consumption, and thus, for a long time, the state of charge (HOC) of battery 1 can be kept above a SOC level that enables or permits the vehicle's power-running.

Furthermore, in the shown embodiment, when the battery temperature Tbat is less than the second set temperature Tbat2 near the freezing point of the battery electrolyte (see step S17), a predictive time before the battery electrolyte thaws out is predicted based on a combination of the battery temperature Tbat and the outside air temperature Tatm, and then the predictive time is set at the next controller startup time Δt (see step S14).

Immediately when the next controller startup time Δt has expired, with a "wakeup" of the control program shown in FIG. 3, at step S13 a check is made to determine whether the battery temperature Tbat has fallen to a temperature value less than the first set temperature Tbat1. When such a battery temperature fall condition of Tbat<Tbat1 has been satisfied, heater 2 is battery-driven for heating the battery 1 (see step S19).

For the reasons discussed above, when an electrolyte of battery 1 has already frozen, the system can be kept in a "sleep" state (a standby state) until such time that the battery electrolyte naturally thaws out. Immediately when the battery electrolyte has naturally thawed out, in the same manner as discussed previously, temperature control is performed by means of the heater 2. Thus, it is possible to certainly prevent the battery electrolyte from freezing up again.

By the way, the next controller startup time Δt (i.e., the time before the battery electrolyte thaws out), set at step S14 after step S17 has determined that Tbat<Tbat2 is satisfied, may be set at a fixed time length. However, as discussed previously by reference to the embodiment, preferably, the next controller startup time is derived based on a combination of battery temperature Tbat and outside air temperature Tatm, from the preprogrammed map. This enables battery temperature control, more effectively utilizing the earliest thawing time of the battery electrolyte. Thus, it is possible to more certainly rapidly carry out or initiate a startup (a "wakeup") of the controller immediately after naturally thawed out, and also it is possible to suppress the energy consumption of battery 1 to a minimum.

In lieu thereof, in the case of the battery electrolyte frozen, the next controller startup time may be set to enable or permit a startup of the controller during the time zone from 12 o'clock (noon) to 16 o'clock, in which there is an increased tendency for the outside air temperature reaches the highest temperature of the day.

The invention claimed is:

1. A battery temperature control device for temperature-controlling by heating a battery with a heater when the battery becomes less than a predetermined temperature, comprising:
    a battery-temperature fall time prediction means for predicting, based on a combination of a temperature of the battery and an outside air temperature, a predictive time before the temperature of the battery is likely to be less than the predetermined temperature, such that the battery temperature control device shifts to a sleep state that disables operation for determining whether or not the temperature of the battery is less than the predetermined temperature, after the predictive time for a battery temperature fall has been predicted; and
    a heating necessity determination means for determining a necessity of heating with the heater by starting up the battery temperature control device from the sleep state that disables operation for determining whether or not the temperature of the battery is less than the predetermined temperature and by determining whether or not the temperature of the battery is less than the predetermined temperature when the predictive time, predicted by the battery-temperature fall time prediction means, has expired,
    wherein, during a turned-OFF state of an ignition switch, (i) operation for predicting the predictive time before the temperature of the battery is likely to be less than the predetermined temperature, (ii) operation for shifting to the sleep state after the predictive time for a battery temperature fall has been predicted, and (iii) operation for determining the necessity of heating with the heater by starting up the battery temperature control device from the sleep state and by determining whether or not the temperature of the battery is less than the predetermined temperature when the predictive time, predicted by the battery-temperature fall time prediction means, has expired, are repeatedly executed.

2. A battery temperature control device as recited in claim 1, wherein:
    the predetermined temperature is a first set temperature higher than a freezing point of a battery electrolyte; and
    the battery-temperature fall time prediction means is configured to predict, based on the combination of the battery temperature and the outside air temperature, the predictive time that the temperature of the battery is likely to be less than the first set temperature, when the battery temperature is higher than or equal to the predetermined temperature.

3. A battery temperature control device as recited in claim 1, which further comprises:
    a battery electrolyte thawing time prediction means for predicting a predictive time before the battery electrolyte thaws out, when the battery temperature is less than a second set temperature near the freezing point of the battery electrolyte,
    wherein a determination on the heating necessity by the heating necessity determination means is initiated, when the predictive time, predicted by the battery electrolyte thawing time prediction means, has expired.

4. A battery temperature control device as recited in claim 3, wherein:
    the battery electrolyte thawing time prediction means is configured to predict, based on the combination of the battery temperature and the outside air temperature, the predictive time before the battery electrolyte thaws out.

5. A battery temperature control device for temperature-controlling by heating a battery with a heater when the battery becomes less than a predetermined temperature, comprising:
    a battery-temperature fall time prediction circuit configured to predict, based on a combination of a temperature of the battery and an outside air temperature, a predictive time before the temperature of the battery is likely to be less than the predetermined temperature, such that the battery temperature control device shifts to a sleep state that disables operation for determining whether or not the temperature of the battery is less than the predetermined temperature, after the predictive time for a battery temperature fall has been predicted; and
    a heating necessity determination circuit configured to determine a necessity of heating with the heater by starting up the battery temperature control device from the sleep state and by determining whether or not the temperature of the battery is less than the predetermined temperature when the predictive time, predicted by the battery-temperature fall time prediction circuit, has expired, wherein, during a turned-OFF state of an ignition switch, (i) operation for predicting the predictive time before the temperature of the battery is likely to be less than the predetermined temperature, (ii) operation for shifting to the sleep state after the predictive time for a battery temperature fall has been predicted, and (iii) operation for determining the necessity of heating with the heater by starting up the battery temperature control device from the sleep state and by determining whether or not the temperature of the battery is less than the predetermined temperature when the predictive time, predicted by the battery-temperature fall time prediction circuit, has expired, are repeatedly executed.

6. A battery temperature control device as recited in claim 5, wherein:

the predetermined temperature is a first set temperature higher than a freezing point of a battery electrolyte; and the battery-temperature fall time prediction circuit is configured to predict, based on the combination of the battery temperature and the outside air temperature, the predictive time that the temperature of the battery is likely to be less than the first set temperature, when the battery temperature is higher than or equal to the predetermined temperature.

7. A battery temperature control device as recited in claim 5, which further comprises:

a battery electrolyte thawing time prediction circuit configured to predict a predictive time before the battery electrolyte thaws out, when the battery temperature is less than a second set temperature near the freezing point of the battery electrolyte, wherein a determination on the heating necessity by the heating necessity determination circuit is initiated, when the predictive time, predicted by the battery electrolyte thawing time prediction circuit, has expired.

8. A battery temperature control device as recited in claim 7, wherein:

the battery electrolyte thawing time prediction circuit is configured to predict, based on the combination of the battery temperature and the outside air temperature, the predictive time before the battery electrolyte thaws out.

9. A battery temperature control device as recited in claim 1, wherein:

the battery temperature control device is configured to temperature-control by heating the battery with the heater, only when the heating necessity determination means determines that the temperature of the battery is less than the predetermined temperature, after the predictive time has expired.

10. A battery temperature control device as recited in claim 9, wherein:

when the heating necessity determination means determines that the temperature of the battery is higher than or equal to the predetermined temperature, after the predictive time has expired, the predictive time is re-predicted by the battery-temperature fall time prediction means and thereafter the sleep state of the battery temperature control device is maintained.

11. A battery temperature control device as recited in claim 5, wherein:

the battery temperature control device is configured to temperature-control by heating the battery with the heater, only when the heating necessity determination circuit determines that the temperature of the battery is less than the predetermined temperature, after the predictive time has expired.

12. A battery temperature control device as recited in claim 11, wherein:

when the heating necessity determination circuit determines that the temperature of the battery is higher than or equal to the predetermined temperature, after the predictive time has expired, the predictive time is re-predicted by the battery-temperature fall time prediction circuit and thereafter the sleep state of the battery temperature control device is maintained.

* * * * *